United States Patent
Chaturapruek et al.

(10) Patent No.: US 11,429,892 B2
(45) Date of Patent: Aug. 30, 2022

(54) RECOMMENDING SEQUENCES OF CONTENT WITH BOOTSTRAPPED REINFORCEMENT LEARNING

(71) Applicant: ADOBE INC., San Jose, CA (US)

(72) Inventors: Sorathan Chaturapruek, Stanford, CA (US); Georgios Theocharous, San Jose, CA (US); Kent Andrew Edmonds, San Jose, CA (US)

(73) Assignee: ADOBE INC., San Jose, CA (US)

( * ) Notice: Subject to any disclaimer, the term of this patent is extended or adjusted under 35 U.S.C. 154(b) by 1049 days.

(21) Appl. No.: 15/934,531

(22) Filed: Mar. 23, 2018

(65) Prior Publication Data

US 2019/0295004 A1 Sep. 26, 2019

(51) Int. Cl.
*G06K 9/62* (2022.01)
*G06N 20/00* (2019.01)
*G06N 5/04* (2006.01)
*G06F 9/451* (2018.01)
*G06T 11/60* (2006.01)

(52) U.S. Cl.
CPC ............. *G06N 20/00* (2019.01); *G06F 9/453* (2018.02); *G06K 9/6256* (2013.01); *G06N 5/04* (2013.01); *G06T 11/60* (2013.01)

(58) Field of Classification Search
CPC ................................................... G06K 9/6256
See application file for complete search history.

(56) References Cited

U.S. PATENT DOCUMENTS

| | | | | |
|---|---|---|---|---|
| 10,466,978 | B1* | 11/2019 | Vidan | G06N 20/00 |
| 2007/0203871 | A1* | 8/2007 | Tesauro | G06N 3/006 |
| | | | | 706/53 |
| 2009/0228479 | A1* | 9/2009 | Nishiyama | A63F 13/35 |
| 2010/0192063 | A1* | 7/2010 | Saoumi | G09B 19/0053 |
| | | | | 715/707 |
| 2011/0043437 | A1 | 2/2011 | Tang et al. | |

(Continued)

OTHER PUBLICATIONS

Agrawal, S., & Goyal, N. (Jun. 2012). Analysis of thompson sampling for the multi-armed bandit problem. In Conference on Learning Theory (pp. 39-1).

(Continued)

*Primary Examiner* — Di Xiao
(74) *Attorney, Agent, or Firm* — Shook, Hardy & Bacon LLP

(57) ABSTRACT

Systems and methods provide a recommendation system for recommending sequential content. The training of a reinforcement learning (RL) agent is bootstrapped from passive data. The RL agent of the sequential recommendations system is trained using the passive data over a number of epochs involving interactions between the sequential recommendation system and user devices. At each epoch, available active data from previous epochs is obtained, and transition probabilities are generated from the passive data and at least one parameter derived from the currently available active data. Recommended content is selected based on a current state and the generated transition probabilities, and the active data is updated from the current epoch based on the recommended content and a resulting new state. A clustering approach can also be employed when deriving parameters from active data to balance model expressiveness and data sparsity.

20 Claims, 10 Drawing Sheets

(56) References Cited

U.S. PATENT DOCUMENTS

| | | | | |
|---|---|---|---|---|
| 2012/0069738 | A1* | 3/2012 | Noda | H04W 28/08 |
| | | | | 370/232 |
| 2018/0189282 | A1* | 7/2018 | Hartlaub | G06F 16/437 |
| 2018/0189391 | A1* | 7/2018 | Ip | G06F 16/635 |
| 2019/0080251 | A1* | 3/2019 | Shyamal | G06N 5/04 |
| 2020/0042567 | A1* | 2/2020 | Birch | G06F 16/954 |

OTHER PUBLICATIONS

Kitts, B., Freed, D., & Vrieze, M. (Aug. 2000). Cross-sell: a fast promotion-tunable customer-item recommendation method based on conditionally independent probabilities. In Proceedings of the sixth ACM SIGKDD international conference on Knowledge discovery and data mining (pp. 437-446). ACM.

Russo, D., & Van Roy, B. (2016). An information-theoretic analysis of Thompson sampling. The Journal of Machine Learning Research, 17(1), 2442-2471.

Shani, G., Heckerman, D., & Brafnan, R. I. (2005). An MDP-based recommender system. Journal of Machine Learning Research, 6(Sep), 1265-1295.

Theocharous, G., Vlassis, N., & Wen, Z. (Mar. 2017). An Interactive Points of Interest Guidance System. In Proceedings of the 22nd International Conference on Intelligent User Interfaces Companion (pp. 49-52). ACM.

First Action Interview Office Action dated Jul. 13, 2022 in U.S. Appl. No. 15/886,263, 3 pages.

Preinterview First Office Action dated May 24, 2022 in U.S. Appl. No. 15/886,263, 5 pages.

* cited by examiner

Three modes of boosting when recommending action $a$:

202 — Delta ($\delta$): count ($a$) ← count ($a$) + $\delta$

Example (n-gram, history of 1):

Frequency dictionary = {pg1: {pg2: 9, pg3: 7}, pg2: {pg1: 3, pg3: 6}, ...}

→ action = on pg1, recommend pg2 with $\delta$ = 6

Frequency dictionary = {pg1: {pg2: 9 + 6, pg3: 7}, pg2: {pg1: 3, pg3: 6}, ...}

204 — Alpha ($\alpha$): count ($a$) ← count ($a$) + $\alpha$

206 — Eta ($\eta$): $p(a)$ ← $\eta$ ; rescale the rest among the 1 − $\eta$ mass

*FIG. 2*

RECOMMENDING SEQUENCES OF CONTENT WITH BOOTSTRAPPED REINFORCEMENT LEARNING

BACKGROUND

Various tools, such as software applications, often impose a significant learning curve for users. For instance, a complex software tool, such as a photo-editing application, may include many features, the use of each requiring the user to perform multiple actions and/or configure multiple parameters. Furthermore, some application features may be similar in some aspects, but different in other aspects. It may not be immediately obvious which feature is appropriate for a given context or use. Without sufficient guidance, a new user may be overwhelmed and/or frustrated when first using a complex tool. Even seasoned users of an application may experience difficulty when attempting to use a new feature, or a particular feature for which the user lacks explicit experience. If the learning curve is sufficiently steep, some users may even terminate, or at least significantly decrease, their use of an application.

To assist and retain users, some conventional software applications include supporting tutorial content, such as textual, audio, and/or video tutorial content. Some conventional applications may even include a recommendation system that recommends tutorial content based on the user's use of the application. For instance, a user may be enabled to use search queries to search a tutorial database for relevant tutorials. To efficiently educate the user, the order (or sequence) in which the tutorials are viewed may be important. That is, some ordered sequences of tutorials may be of greater educational benefit than other ordered sequences of the same tutorials. As such, some conventional software applications include a sequential recommendation system that provides sequences of recommended tutorial content, wherein a given recommendation is based on the user's history of viewing other tutorial content. However, such conventional sequential recommendation systems may require significant manual curation of sequences of content to recommend.

Reinforcement learning (RL) has shown promise in the enablement of effective sequential recommendation systems. However, conventional RL requires significant exploration of the learning environment to determine an optimized recommendation policy. In the context of sequentially recommending tutorial content to users, such conventional exploration of the learning environment requires repeatedly recommending content to numerous users in numerous states and observing associated (and often delayed) reward signals, such as the user continuing (or terminating) the use of the application, in view of the recommended content. Such conventional exploration of a learning environment is costly. When implementing a sequential recommendation system, such conventional RL may not be practical, at least because adequately exploring the learning environment is too costly, and would likely result in the loss of many users.

SUMMARY

Embodiments of the present invention relate to training and employing a sequential recommendation system for recommending content, such as but not limited to tutorial content for a software application. The training of reinforcement learning (RL) agent of the recommendation system is bootstrapped via passive data and a small amount of initially available active data. Passive data includes information regarding sequences of user actions without any recommendation from a sequential recommendation system. The user action includes user selections of at least portions of the content. The passive data can be collected before the sequential recommendation system is deployed. A RL agent of the sequential recommendations system is trained using the passive data over a number of epochs involving interactions between the sequential recommendation system and user devices. At each epoch, available active data from previous epochs is obtained. Transition probabilities used by the learning agent to select recommendations are generated from the passive data and at least one parameter derived from the currently available active data. Recommendations associated with the content (e.g., recommended content) is selected based on a current state and the generated transition probabilities, and the active data is updated from the epoch based on the recommendations associated with the content and a new state resulting from an action selected by the user in response to the recommendation associated with the content. Using the passive data in this manner allows the learning agent to more quickly and efficiently learn an optimal policy. In some configurations, a clustering approach is also employed when deriving parameters from the active data to balance model expressiveness and data sparsity when training the learning agent. The clustering approach allows model expressiveness to increase as more active data becomes available.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein:

FIG. 2 is a diagram illustrating exemplary linking functions suitable for deriving transition probabilities in accordance with some implementations of the present disclosure;

DETAILED DESCRIPTION

Figure 1A:
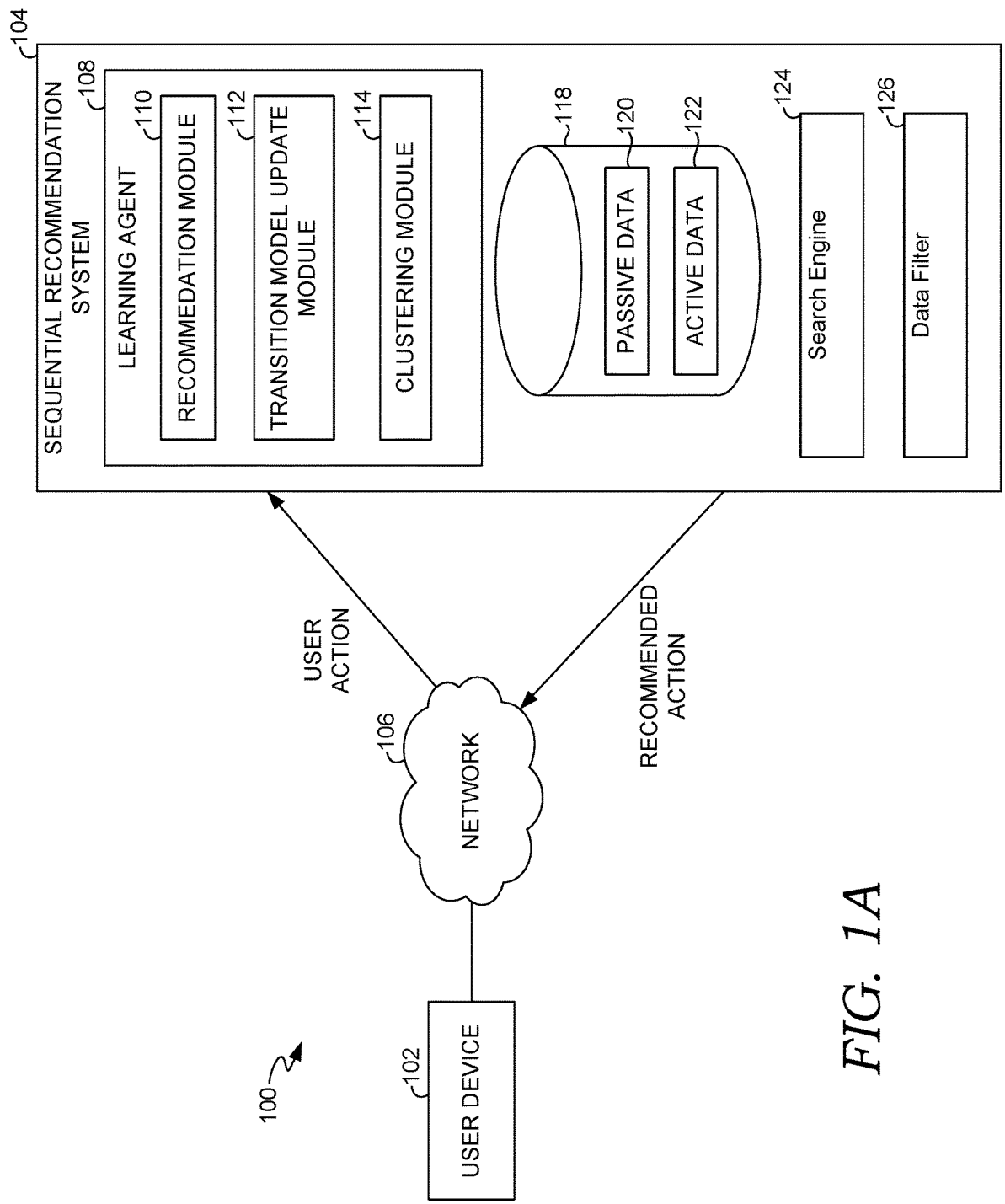
FIG. 1A is a block diagram illustrating an exemplary system in accordance with some implementations of the present disclosure.

The various embodiments are directed towards training and using a sequential recommendation system, wherein training the recommendation system includes bootstrapping a reinforcement learning (RL) agent with passive data and an initial small amount of active data. The recommendation system may recommend sequences of content, such as but not limited to tutorial content for a software application. The embodiments bootstrap the training of the RL agent by employing a combination of the passive data and the initially small amount of active data. The bootstrapping of the RL agent includes alternating and iteratively updating the recommendation policy of the RL agent and generating additional active data. The iterative updates to the recommendation policy are based on the passive data and the currently available active data. Additional active data is iteratively generated by interacting with the users, i.e., providing recommendations to the users and observing their actions and rewards associated with the recommendations.

The content may include textual, audio, and/or video tutorial content for a software application, such as but not limited to an image-editing application. The passive data may encode sequences of user actions, where the users are acting (i.e., selection content) without being provided recommendations associated with the content. For instance, passive data may be collected by observing users browsing available content, wherein recommendations are not being provided during the users' browsing activities, and encodes sequences of viewed content by the users. The active data may encode the users' actions in the context of being provided recommendations. The active data may additionally encode a reward signal that indicates a benefit of the recommendations and/or the users' action in response to being provided the recommendations.

In contrast to conventional RL, the various embodiments require only a small amount of initial active data. That is, the embodiments herein are employable in learning environments where mostly passive data is available and the generation of active data is costly. For example, passive data may be readily available for the context of recommending tutorial content to users of a software application, wherein the generation of active data may be somewhat costly. For some applications, such as but not limited to image- and/or photo-editing applications, vast amounts of passive data is available via the observation of users browsing and viewing tutorial content. The recommendation policy may be trained based on various rewards signals, such as but not limited to viewing time of the content, engagement with the content, transforming trial users into subscribed users, retention rate of users, and the like. As such, the recommendation policy may be trained to maximize, or at least increase, any suitable value function based on observed rewards.

Although the various embodiments of training and employing a sequential recommendation system are discussed in the context of recommending sequential tutorial content, the embodiments are not so limited. Content other than tutorial content, such as entertainment content, may be recommended. The bootstrapped recommendation systems discussed herein may be employed to provide optimized recommendations for many disparate tasks, based on the choice of observed rewards and the value function being optimized.

Reinforcement learning (RL) techniques are employed to generate the bootstrapped sequential recommendation systems discussed herein. Sequential recommendation systems conventionally employ RL to train an RL agent (or simply an agent) to provide recommendations. Various aspects of conventional RL are discussed herein to contrast with the passive data bootstrapping RL methods presented herein. Markov decision processes (MDP) are often used as a model for sequential recommendation systems. The learning environment is modeled as a plurality of states of the environment. Training the learning agent may include determining a recommendation policy that tends to maximize a value function based on observed rewards. The recommendation policy (deterministically or statistically) determines an action (i.e., a recommendation associated with content) based on a current state. A transition model (deterministically or statistically) determines a next state (or state transition) based on an action.

Such conventional RL techniques involve training a learning agent from many interactions with users. Generally, in each interaction with a user, referred to herein as an "epoch," the learning agent selects a recommendation based on a current state and a transition model. The current state can be based on, for instance, previous user actions and recommended actions (i.e., recommendations associated with content) over a session with a user. A reward signal (or simply a reward) is provided to the learning agent for each epoch that can be based on the recommended action (i.e., a recommendation associated with the content) and a new state resulting from a user action taken in response to the recommended action. The reward signal may be positive or negative. In this way, the learning agent learns an optimal recommendation policy for selecting recommended actions.

The transition model used by the learning agent for selecting a recommended action at each epoch include may include transition probabilities that each reflect the probability of a new state that would result from a current state if a particular recommended action is provided. The transition probabilities are conventionally derived from active data. Active data comprises historical information regarding what actions users have taken given recommended actions from the learning agent. A conventional sequential recommendation system requires a large amount of active data to derive optimal transition probabilities. Unfortunately, only limited active data, if any at all, is available in many circumstances, for instance, when developing a new sequential recommendation system for recommending tutorial content for a software application. Active data can be gathered through use of such sequential recommendation systems, but this could take an unreasonable amount of time for the learning agent to learn an optimal policy.

In contrast to conventional RL, embodiments of the present disclosure may bootstrap the training of a RL agent, while having insufficient active data to train a RL agent of a sequential recommendation system by bootstrapping the sequential recommendation system from passive data. As, passive data comprises historical information regarding sequences of user actions, e.g., sequences of content viewed by users. However, unlike active data, passive data does not include information regarding recommended actions from a sequential recommendation system. For instance, take the example of a tutorial system that provides tutorials content to educate users on the use of features of a software application. In the absence of any recommendation system, users can navigate (i.e., browse) from one tutorial to another. Information regarding the sequences of tutorials viewed by users could be available as passive data when developing a sequential recommendation system to recommend tutorials to users.

Because passive data includes sequences of user actions without recommendations, the data doesn't provide information regarding how users would react to recommendations. The passive data only provides information for deriving the probabilities of new states given current states, and as such cannot be used alone to derive transition probabilities that reflect the probabilities of new states given currents states and recommend actions. Accordingly, as will be described in further detail below, implementations of the technology described herein employ linking functions to bridge between the passive data and transition probabilities. The linking functions generate parameters from currently available active data, and transition probabilities are derived from the passive data and the parameters from the linking functions. At each epoch, additional active data is collected, and new transition probabilities can be generated based on the passive data and parameters derived from the currently available active data. By leveraging the passive data, the learning agent can learn an at least somewhat optimized recommendation policy more quickly when deploying a sequential recommendation system.

Various embodiments for training a recommendation system, or a learning agent of the recommendation system, by bootstrapping from passive data are discussed in U.S. application Ser. No. 15/886,263 ('263 application), entitled BOOTSTRAPPING RECOMMENDATION SYSTEMS FROM PASSIVE DATA, filed Feb. 1, 2018, the contents of which are incorporated herein in entirety. It should be noted that any of the embodiments discussed in the '263 application may be employed to train the recommendation systems discussed herein.

Some implementations of the embodiments herein additionally employ an approach that balances model expressiveness and data availability. Model expressiveness reflects the variability in parameters used to generate transition probabilities. At one end of the spectrum, a single global parameter could be used for all combinations of states and actions. This provides an abundance of data for deriving the parameter but suffers from low model expressiveness. At the other end of the spectrum, a parameter could be used for each combination of states and actions. This provides high model expressiveness, but suffers from data sparsity. Some embodiments employ a clustering approach to provide a trade-off between the two extremes. As will be described in further detail below, the clustering approach involves generating a preliminary parameter value for each state and clustering states with similar parameter values. For each cluster, a shared parameter value is determined from preliminary parameter values of states in the cluster, and the shared parameter value is assigned to each of those states in the cluster. The number and size of clusters used can be adjusted to balance model expressiveness with data sparsity. This can include clustering based on confidence values associated with shared parameter values based on data availability.

Aspects of the embodiments disclosed herein provide a number of advantages over conventional solutions. For instance, one conventional approach involves a MDP-based recommendation system that assumes that the effect of recommending each action is fixed by some popularity measure and doesn't learn those parameters. However, assuming the effect of recommending an action has a significant drawback when the assumed value is biased. To avoid such bias, implementations of the technology described herein, for instance, systematically develop an algorithm to learn the correct causal effect of recommending an action while taking data sparsity into account. Some other previous work addressed the problem of data sparsity partially. The parameterization in this previous model, however, is less expressive, and thus it learns to optimize the objective more slowly due to a model bias. Another previous work studied the effect of recommending an action as compared to a system without recommendations. However, in that work, only one parameter is used for the impact of the recommendations. The algorithm used in that work doesn't use data availability to tradeoff with model expressiveness to further optimize the learning algorithm.

Example Operating Environment

With reference now to the drawings, FIG. 1A is a block diagram illustrating an exemplary system 100 for using passive data 120 to train a learning agent 108 of a sequential recommendation system 104 to provide recommended actions in accordance with implementations of the present disclosure. That is, sequential recommendation system 104 is trained via bootstrapping with passive data 120 and active data 122. Recommendation system 104 may recommend content, such as but not limited to tutorial content for a software application. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

The system 100 is an example of a suitable architecture for implementing certain aspects of the present disclosure. Among other components not shown, the system 100 includes a user device 102 interacting with a sequential recommendation system 104 that is configured to iteratively provide recommended actions to the user device 102. Each of the components shown in FIG. 1A can be provided on one or more computing devices, such as the computing device 700 of FIG. 7, discussed below. As shown in FIG. 1, the user device 102 and the recommendation system 104 can communicate via a network 106, which may include, without limitation, one or more local area networks (LANs) and/or wide area networks (WANs). Such networking environments are commonplace in offices, enterprise-wide computer networks, intranets, and the Internet. It should be understood that any number of user devices and recommendation systems may be employed within the system 100 within the scope of the present invention. Each may comprise a single device or multiple devices cooperating in a distributed environment. For instance, the sequential recommendation system 104 could be provided by multiple server devices collectively providing the functionality of the sequential recommendation system 104 as described herein. Additionally, other components not shown may also be included within the network environment.

The sequential recommendation system 104 is generally configured to provide recommended actions to user devices, such as the user device 102. This could be recommended actions within the context of any of a variety of different types of applications. The user device 102 can access and communicate with the sequential recommendation system 104 via a web browser or other application running on the user device 102 via the network 106. Alternatively, in other embodiments, the recommendation system 104 or portions thereof can be provided locally on the user device 102.

In some embodiments, a user may interact with and/or provide search queries to a search engine, such as search engine 124. Search engine 124 may be an elastic search engine. Learning agent 108 may be employed to recommend content to search engine 124. The recommendations may be provided to the user via search engine 124.

At a high level, the sequential recommendation system 104 includes a learning agent 108 that is trained to iteratively provide recommended actions to the user device 102 over epochs. For each epoch: the learning agent 108 provides a recommended action to the user device 102 based on a current state; information is returned regarding a user action taken after providing the recommended action; a new state is derived based at least in part on the recommended action and user action; and a reward is provided for training the learning agent 108. The learning agent 108 uses such information to improve its recommendation algorithm at each epoch. Learning agent 108 may be a reinforcement learning (RL) learning agent. While only a single user device 102 is shown in FIG. 1, it should be understood that the learning agent 108 may be trained by interactions with any number of user devices.

The learning agent 108 includes a recommendation module 110, a transition model update module 112, and a clustering module 114. The recommendation module 110 is configured to select a recommended action for an epoch based on a current state and a transition model. Each state is based on information that can include one or more previous user actions and one or more previous recommended actions from the sequential recommendation system 104 over a session between the user device 102 and the sequential recommendation system 104.

The transition model includes transition probabilities that are used for selecting a recommended action based on the current state. The transition probabilities comprise probabilities between each pair of available states for each available recommended action. In other words, the transition probability of a new state s' given a current state s and recommended action a can be reflected as p (s'|s, a). In some configurations, the recommendation module 110 uses Markov decision processes (MDP) employing MDP-based transition probabilities.

Conventionally, active data provides information from which a transition model can be built. However, an accurate transition model requires a large amount of active data that is often not available, for instance, for newly deployed recommendation systems in which information regarding recommended actions is minimal or nonexistent. As will be described in further detail below, the sequential recommendation system 104 leverages passive data 120 to expedite the learning process. Data filter 126 may filter and/or "clean up" the browsing data 128 of FIG. 1B of a plurality of users to generate passive data 120

The transition model update module 112 generally operates to generate transition probabilities using passive data 120 and active data 122 (stored in datastore 118). The passive data 120 can include a collection of historical user actions taken without recommended actions from the sequential recommendation system 104. For instance, if the sequential recommendation system 104 is being trained to recommend tutorials for a software application, the passive data 120 could include historical information regarding sequences of tutorials viewed by users in the absence of any recommendations. The transition model update module 112 can take the passive data and construct, for instance, n-grams to predict the impact of next recommended actions given n-history of actions. The transition model update module 112 is deployed incrementally where at each epoch it learns transition probabilities (e.g., parameterized MDP transition probabilities) by using a passive model from the passive data 120 as a prior and using active data 122 that is captured at each epoch to update the prior.

The passive data 120 provides information to determine the probability of a new state s' given a current state s, which can be reflected as p (s'|s). However, as noted above, the transition model used by the recommendation module 110 requires transition probabilities that reflect the probability of new states given current states and recommended actions—i.e., p (s'|s, a). In the recommendation context, where a represents a recommended action, focus can be placed on a subclass of relationships between p (s'|s, a) and p (s'|s). A linking function provides a bridge between the passive data and the transition probabilities. In other words, the linking function provides for the difference between p (s'|s) provided by the passive data and p (s'|s, a) required for transition probabilities. The linking function $f: S \times A \times S \times [0, 1] \to \mathbb{R}$ can be defined as:

$$f(s,a,s',p(s'|s)) \triangleq p(s'|s,a) - p(s'|s)$$

The linking function employs currently available active data 122 to generate parameters that can be used with the passive data 120 to calculate transition probabilities. The active data 122 includes information regarding recommended actions provided by the sequential recommendation system 104 and the states (i.e., previous and new) associated with each recommended action. At each epoch in which the sequential recommendation system 104 provides a recommended action, the active data 122 is updated, and new transition probabilities can be calculated by the transition model update module 112 using new parameters generated from the updated active data 122. The parameterization gets finer at each epoch as more and more active data 122 becomes available, thereby improving the transition probabilities and recommendations.

Exemplary Iterative Workflow for Bootstrapping the Training of a Learning Agent

Figure 1B:
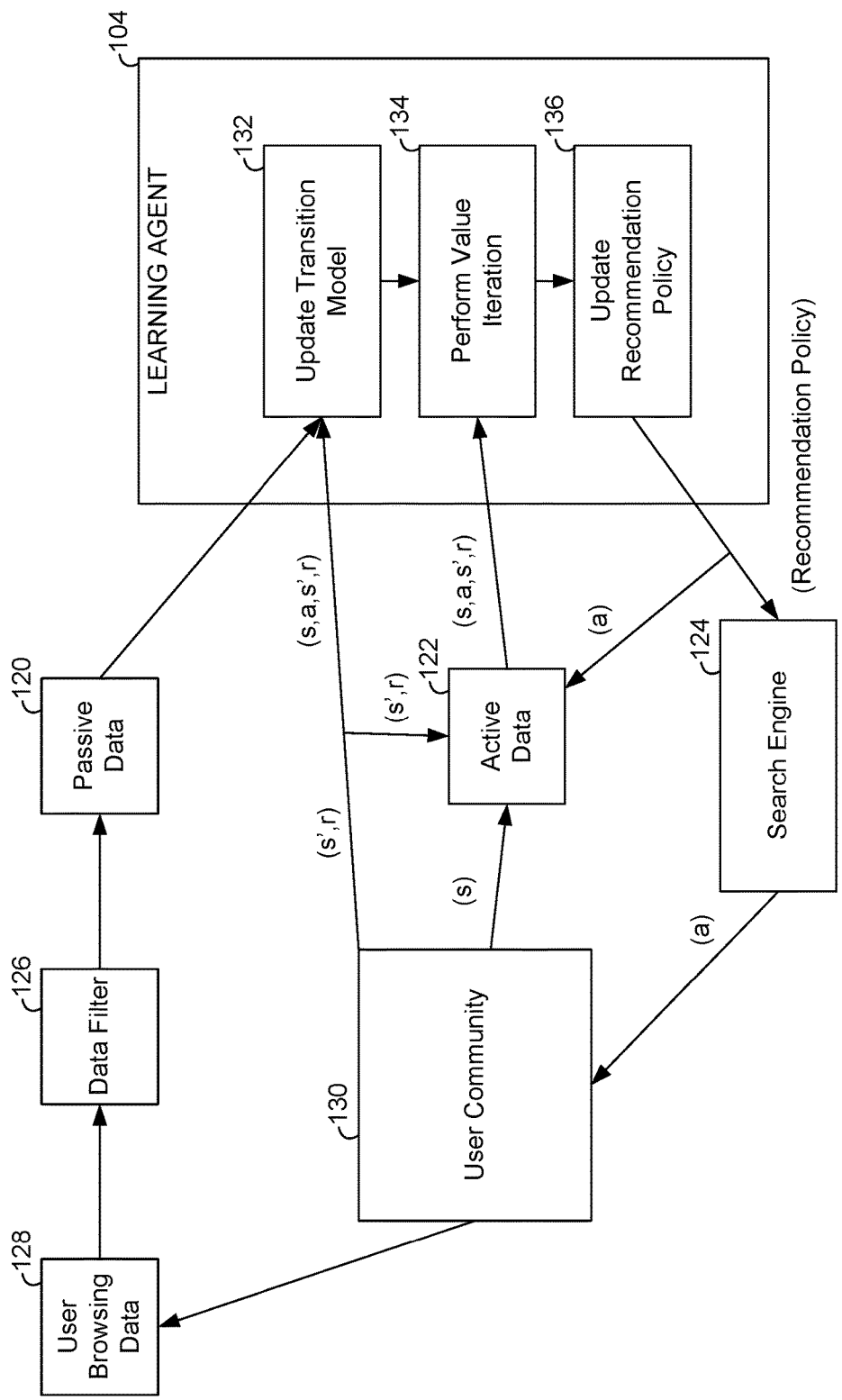
FIG. 1B is a block diagram illustrating an exemplary iterative workflow for bootstrapping a learning agent with passive data in accordance with some implementations of the present disclosure.

FIG. 1B is a block diagram illustrating an exemplary iterative workflow for bootstrapping a learning agent with passive data in accordance with some implementations of the present disclosure. User browsing data 128 may include the browsing and content viewing activities of users without being provided content recommendations. A user community 130 may provide user browsing data 128. Data filter 126 may filter, or "clean up" user browsing data 128 to generate passive data 120. At noted throughout, passive data may encode a plurality of states of the learning environments resulting from the user actions, i.e., user browsing activity. As noted throughout, the user actions may include a plurality of user selections of content without recommendations from a recommendation system.

The user community 130 may provide a small amount of initial active data 122. The active data encodes a small amount of user activity, such as sequences of viewed content, wherein the users received recommendations for the content. The active data additionally encodes a reward signal (r) that indicates a benefit of the provided recommendation, or the user viewing the provided recommendation. More specifically, the active data encodes a current state of the learning environment (s), a state transition from the current state to a new state (s'), and a recommendation (a). The recommendation may be determined via a recommendation policy, based on the current state of the learning environment. The new state may be indicate the user's action, in view of being provided the recommendation. For instance, the new state may indicate the user's action, in view of being provided the recommendation, e.g., whether the user viewed the recommended content, or other content. Thus, in some embodiments, the active data may include an n-tuple, such as but not limited to (s, a, a', r).

To generate the active data, the current state (s) of the learning environment may be observed. A recommendation policy may be employed to determine a recommend action, (a), such as but not limited to recommended content. The search engine 124 may be employed to provide the recommended action to the user. The user's response to the recommendation is observed. A new state of the learning environment (s') may be determined based on the user's action in response to the provided recommendation. A reward signal (r) is also observed. The currently available active data is updated in include this additional active data. FIG. 1B shows active data 122 being iterative updated to include new iterations for the components of the n-tuple (s, a, a', r).

The iterative workflow includes the passive data and the currently available active data 122 and the passive date being employed to update the transition model, as shown in step 132. Various embodiments for updating the transition model based on passive data and currently available active data are discussed below. However, briefly here, the transition model may be iteratively updated based on the sequences of the plurality of states of the environment from, and/or encoded in, the passive data. More specifically, the transition model may be updated by updating the values of one or more parameters of the model based on n-gram models and/or clustering algorithm. The linking function may be updated to update the transition model. Determining the transition probabilities based on the linking function is described in conjunction with FIG. 2. At step 134, a dynamic programming algorithm, such as but not limited to a value iteration, may be performed based on the updated transition model and the currently available active data. For instance, the reward signals included in the active data and the updated transition model may be employed to iterate the value function for the states of the learning environment. At step 136, the recommendation policy is updated based on the value iteration.

The updated recommendation policy is provided to search engine 123 to perform another iteration of the bootstrapped training of learning agent 104. That is, the updated recommendation policy is employed provide additional recommendations to the user community and generate additional currently available active data. The additionally active date is employed to continue to iteratively update the transition model and iteratively update the recommendation policy.

Exemplary Embodiments of Linking Functions for Transition Probabilities

By way of example only and not limitation, FIG. 2 presents three families of linking functions to derive parameter values from the currently available active data 122: delta 202, alpha 204, and eta 206. Delta 202 and alpha 204 are linking functions based on n-gram models that boost the count additively and multiplicatively, respectively. The count (a) shown in FIG. 2 is based on the number of times an action a is observed in the active data 122. Eta 208 is a linking function that sets the probability of a user action given that action is recommended to be a constant eta and redistributes the probability of other actions by the same scale.

Figure 3A:
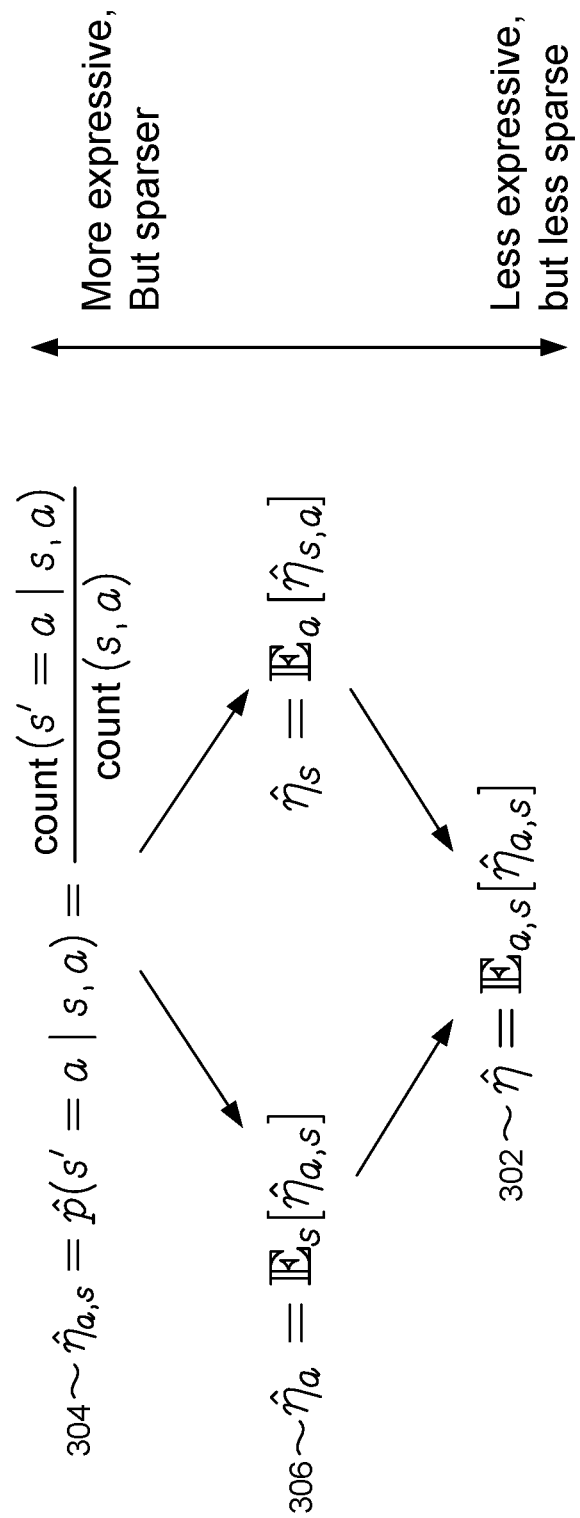
FIG. 3A is a diagram illustrating tradeoff between model expressiveness and data availability in accordance with some implementations of the present disclosure.

The determination of parameters at each epoch can balance model expressiveness and data availability. FIG. 3A illustrates different approaches that can be taken using the maximum likelihood principle. At one extreme (represented at 302), the model maintains only one global parameter (here, a global eta) that is used for all combinations of states and actions. This certainly has a model bias, but it has less variance due to an abundance of data. At the other extreme (represented at 304), a separate parameter value is provided for each action-state pair. This is very expressive, but suffers from data sparsity. Between these two extremes (represented at 306), a parameter can be provided that is dependent on state only or action only.

In accordance with some implementations, a clustering approach is employed by the clustering module 114 that makes a smooth trade-off between the two extremes illustrated in FIG. 3. The clustering approach determines a preliminary parameter value for each of a number of possible states based on the currently available active data 122. States are then clustered together based on the preliminary parameter values—i.e., states with similar preliminary parameter values are grouped together in each of the clusters. A shared parameter value is then derived for each cluster based on the preliminary parameter values for states in each cluster. For instance, the shared parameter value for a cluster could be the mean or median of the preliminary parameter values of states in the cluster. The shared parameter value derived for each cluster is then assigned to each the states grouped in the cluster.

The clustering of states in this manner can be controlled to balance model expressiveness with data availability. Initially, when limited active data is available to the sequential recommendation system 104, fewer clusters with a larger number of states included can be used to offset the data sparsity. As more active data is gathered over time by the sequential recommendation system 104, more clusters with fewer states included can be used to increase model expressiveness. In some embodiments, as more active data is gathered, the clustering can be performed by splitting previous clusters into smaller clusters.

In some configurations, confidence values are calculated for parameters, and the confidence values can be used to control clustering. More particularly, clusters are generated such that the confidence values associated with parameter values satisfy a threshold level of confidence.

Figure 3B:
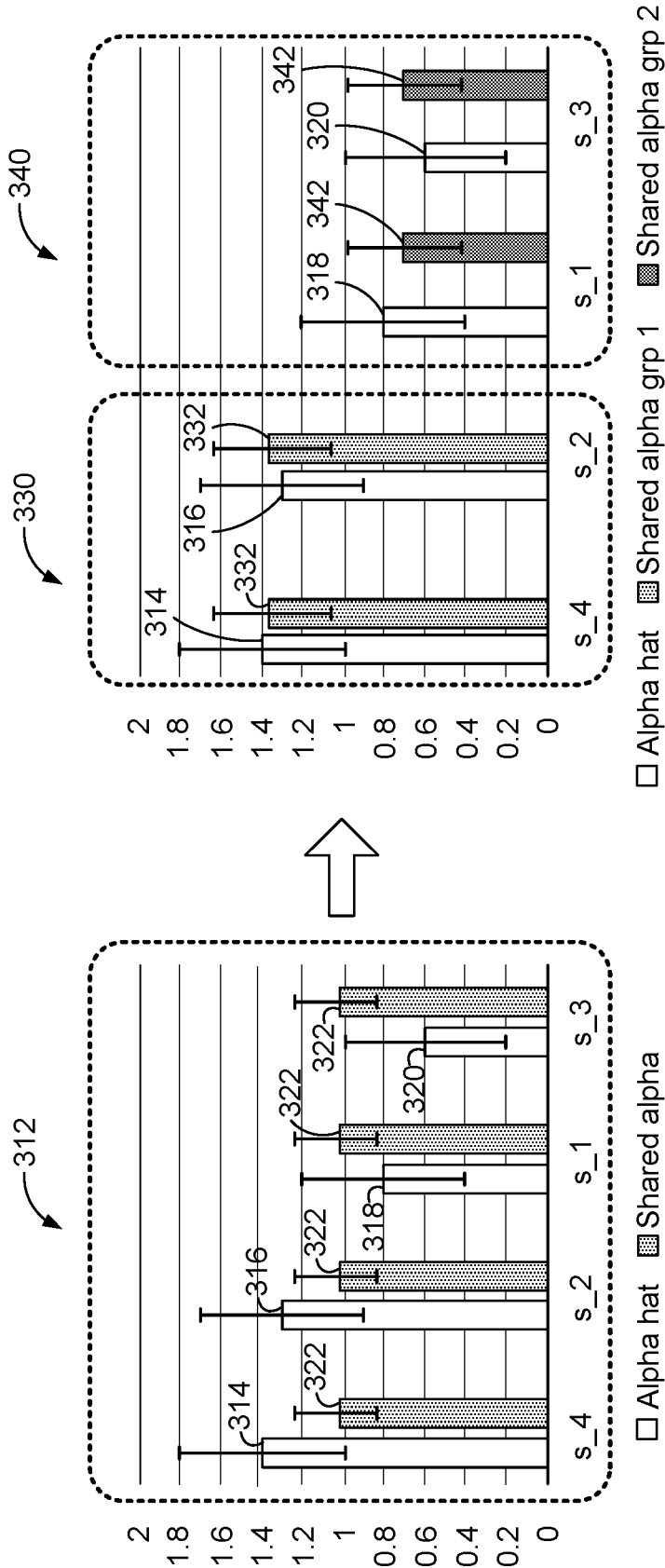
FIG. 3B is a diagram illustrating exemplary clustering to derive parameter values in accordance with some implementations of the present disclosure.

An example of this clustering approach is illustrated in FIG. 3B. Initially, four states (s_1 through s_4) are grouped together in a cluster 312. Preliminary parameter value 314 has been determined for state s_4; preliminary parameter value 316 has been determined for state s_2; preliminary parameter value 318 has been determined for state s_1; and preliminary parameter value 320 has been determined for state s_3. Additionally, a shared parameter value 322 has been determined for the cluster 312 based on the preliminary parameter values 314, 316, 318, and 320. If this clustering is chosen, the shared parameter value 322 would be used for each of the four states, s_1 through s_4.

FIG. 3B also illustrates splitting the cluster 312 into two clusters 330 and 340 based on the preliminary parameter values 314, 316, 318, and 320. The first cluster split 330 includes states s_4 and s_2, and a shared parameter value 332 has been determined based on the preliminary parameter values 314 and 316. The second cluster split 340 includes states s_1 and s_3, and a shared parameter value 342 has been determined based on the preliminary parameter values 318 and 3200. If this clustering is chosen, the shared parameter value 332 would be used for each of the two states in the first cluster 340, s_4 and s_2, and the shared parameter value 342 would be used for each of the two states in the second cluster 340, s_1 and s_3.

As noted above, a confidence value (e.g., a confidence interval) can be computed for each parameter value that facilitates clustering. For instance, FIG. 3B shows a confidence bar with each of the preliminary parameter values 314, 316, 318, 320 and each of the shared parameter values 322, 332, 342. The confidence bars for the preliminary parameter values 314, 316, 318, 320 are longer illustrating lower confidence in those parameter values as less data is available to calculate each of those parameter values. The confidence bars for the shared parameter values 322, 322, 342 are shorter since more data is available to calculate each of those parameter values due to the clustering. As noted above, some configurations employ confidence values to determine clusters by ensuring that the clusters provide parameter values with confidence values that satisfy a threshold level of confidence. For instance, the clustering provided by the clusters 330 and 340 would be selected over the cluster 312 to provide more model expressiveness if the confidence values associated with the shared parameter values 332 and 342 provide sufficient confidence (e.g., satisfy a threshold confidence value).

Generalized Processes for Training and Using a Recommendation System

Figure 5:
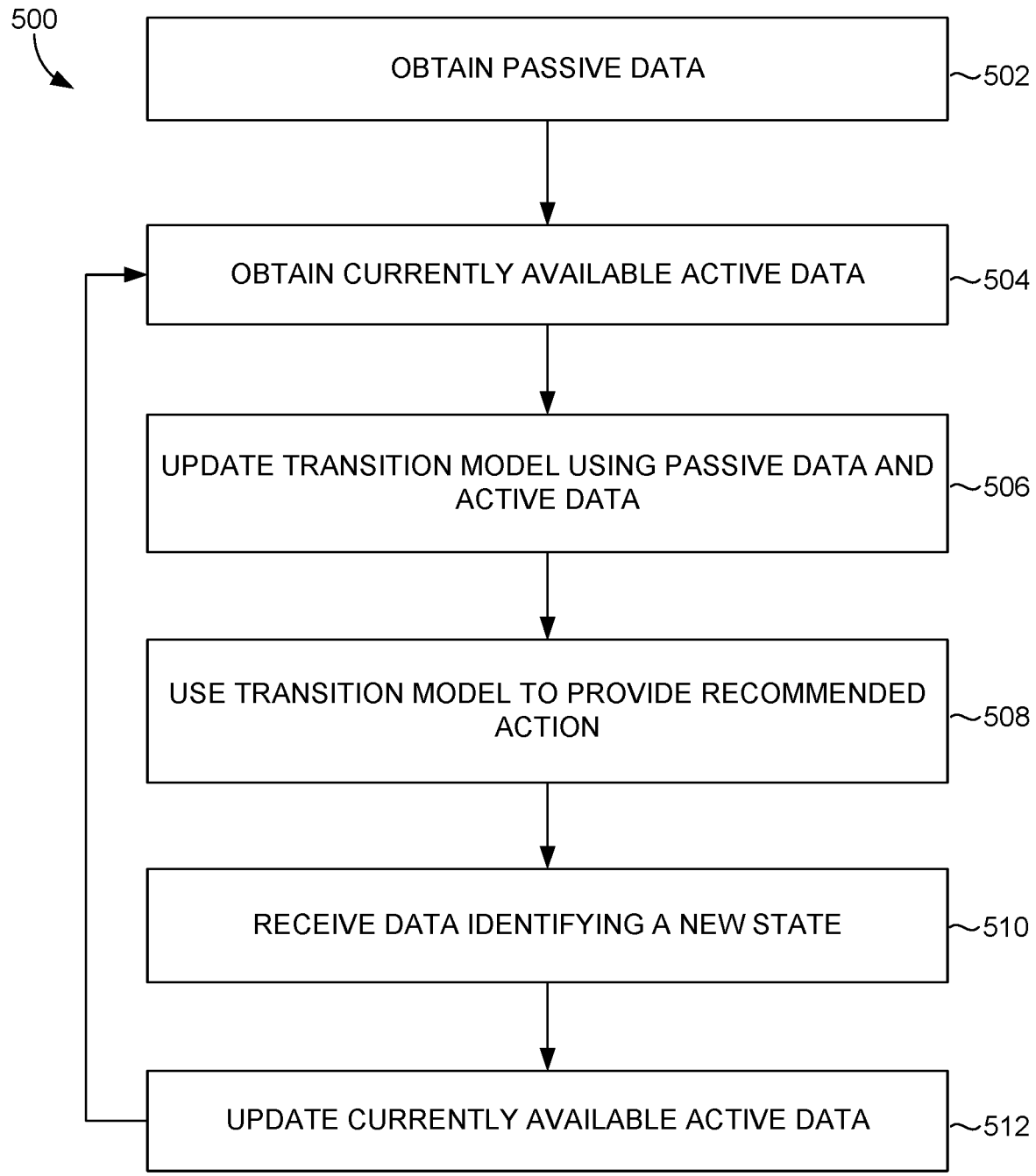
FIG. 5 is a flow diagram showing another method for using passive data when training a learning agent to provide recommendations in accordance with some implementations of the present disclosure.
Figure 6:
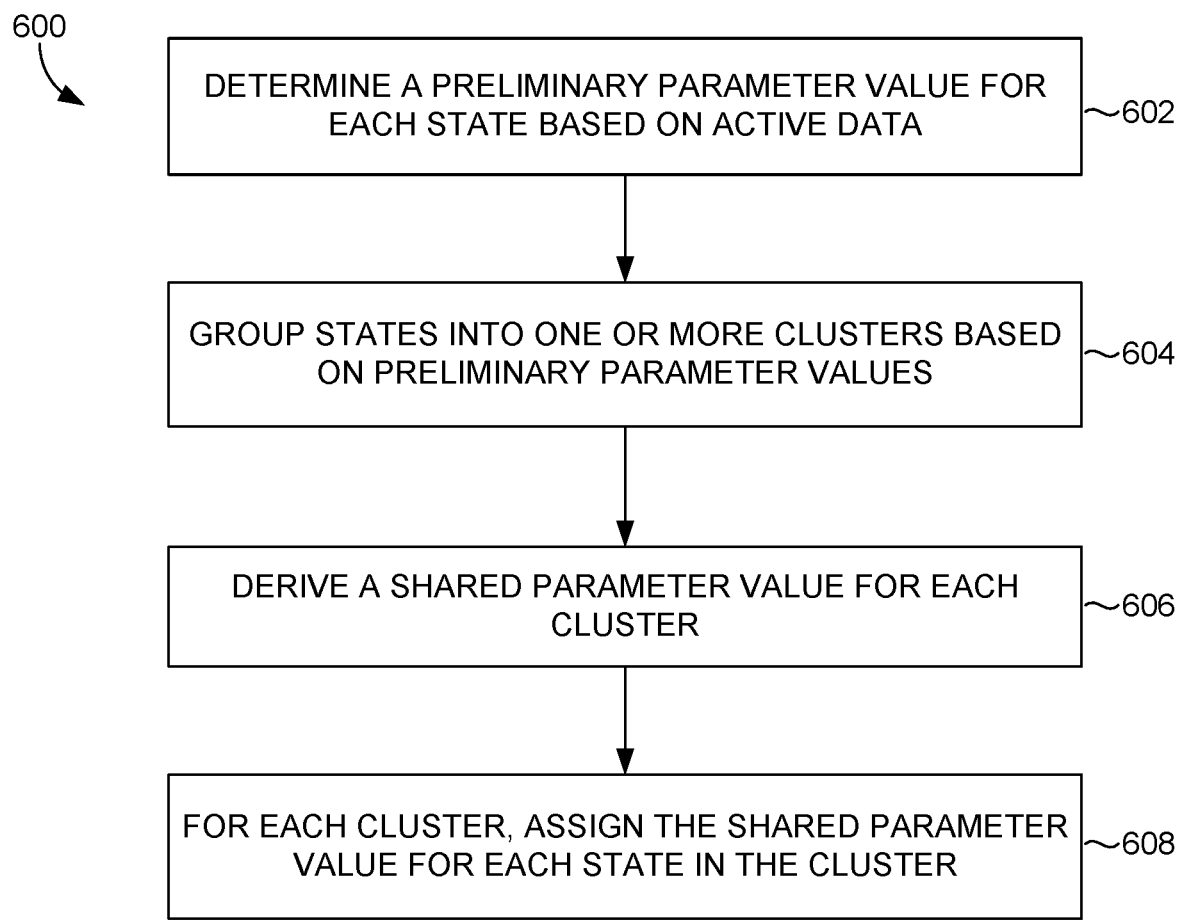
FIG. 6 is a flow diagram showing a method for using a clustering approach to derive parameters used to generate transition probabilities in accordance with some implementations of the present disclosure.
Figure 7:
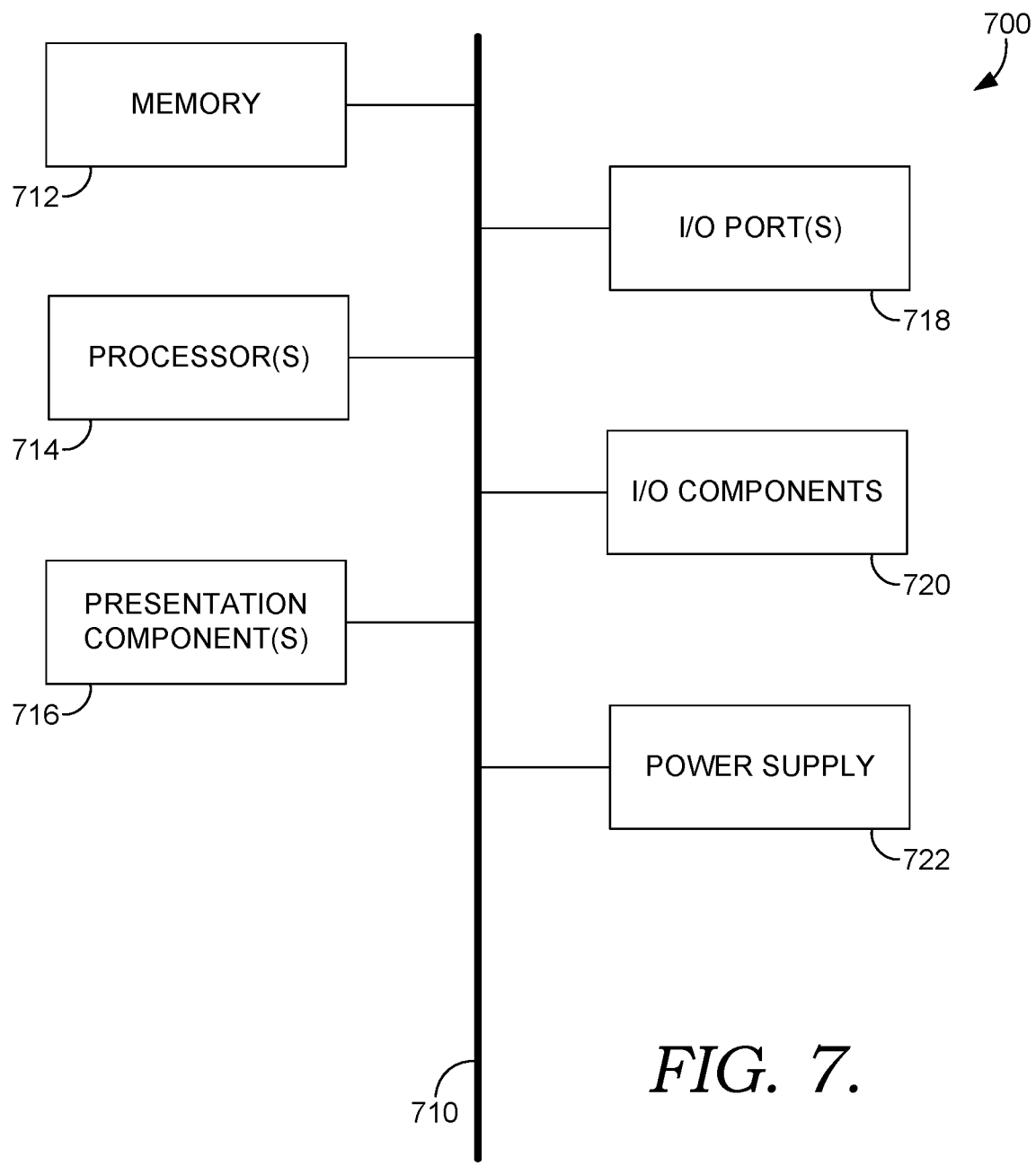
FIG. 7 is a block diagram of an exemplary computing environment suitable for use in implementations of the present disclosure.

Processes 400-600 of FIGS. 4A-6, or portions thereof, may be performed and/or executed by any computing device, such as but not limited to user device 102 of FIG. 1A, as well as computing device 700 of FIG. 7. Additionally, a sequential recommendation system, such as but not limited to training engine 104 of FIG. 1A may perform and/or execute at least portions of processes 400-600.

Figure 4A:
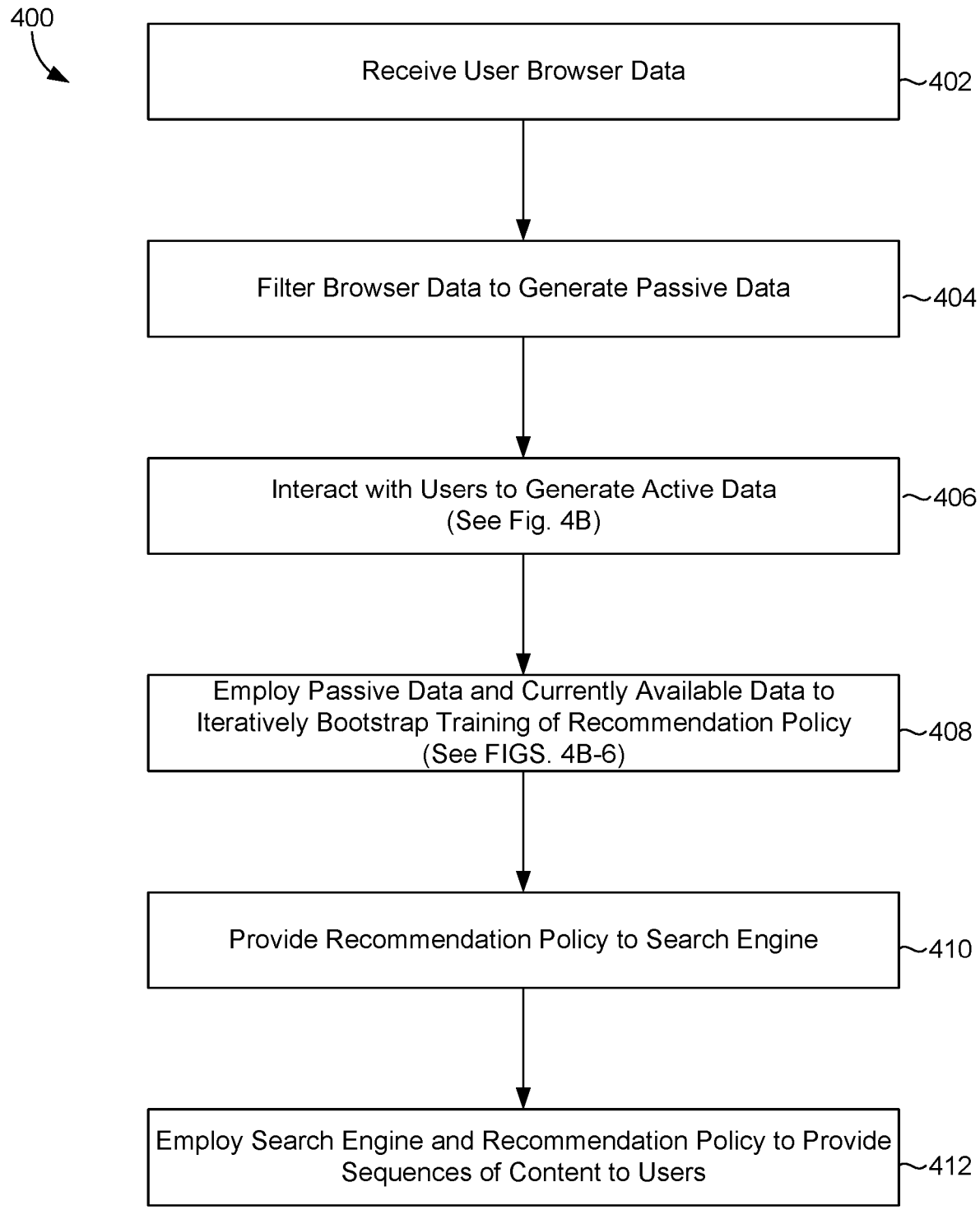
FIG. 4A is a flow diagram showing method for using training and employing a sequential recommendation system in accordance with some implementations of the present disclosure.

FIG. 4A is a flow diagram showing method for using training and employing a sequential recommendation system in accordance with some implementations of the present disclosure. Process 400 begins, at block 402, where user browser data is received. For instance, the browser data may include sequences of content viewed by the users, without recommendations. At bock 404, the browser data is filtered to generate passive data. For instance, data filter 126 may be employed to filter, or "clean up", the user browser data. The passive data may encode a plurality of states of the learning environment, resulting from user actions, i.e., user browsing activity. The user actions may include users selecting sequences of content and each of the states of the learning environment may correspond to a sequence of one or more selected content.

At block 406, active data is generated via interactions with users. Various embodiments of generating active data are discussed in conjunction with process 420 of FIG. 4B. However, briefly here, the active data encodes a current state of the learning environment, a recommendation based on the current state, a state transition from the current state to a new state of the learning environment, and a reward signal. The state transition results from a user action of a user being provided the recommendation. The reward signal indicates a benefit of providing the recommendation or the user action that is in response to being provided the recommendation. A recommendation policy of the learning agent may be employed to determine recommendation. The active data generated at block 406 may be a small amount of initial active data, i.e., currently available active data.

At block 408, the passive data and the small amount of currently available interactive data are employed to iteratively bootstrap the training of a recommendation policy of a reinforcement learning (RL) agent of the recommendation system. Various embodiments of bootstrapping the training of the RL agent are discussed in conjunction with at least processes 420-600 of FIGS. 4B-6. Additional embodiments for bootstrapping the training of a recommendation policy via passive data are discussed in conjunction with the '263 application. Any such embodiments of bootstrapping the training of the RL agent may be employed at block 408.

At block 410 the trained recommendation policy is provided to a search engine, such as but not limited to an elastic search engine of a software application. The elastic search engine may search and recommend available tutorial content for the application. At block 412, the search engine and the recommendation policy are employed to provide sequences of content to users.

Figure 4B:
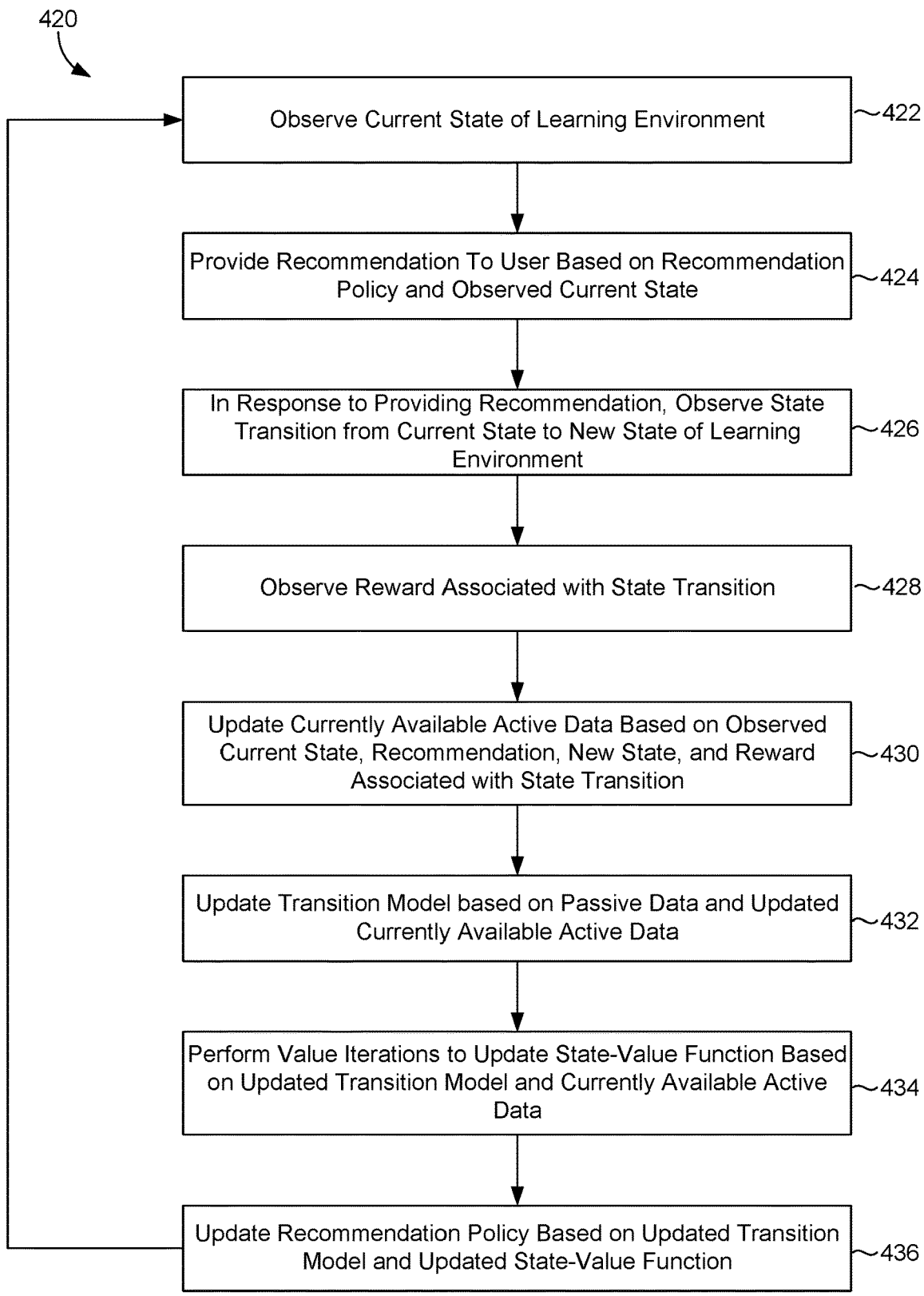
FIG. 4B is a flow diagram showing method for using passive data when training a learning agent to provide recommendations in accordance with some implementations of the present disclosure.

FIG. 4B is a flow diagram showing method for using passive data when training a learning agent to provide recommended action in accordance with some implementations of the present disclosure. Process 520 begins at block 422, the current state (s) of the learning environment is observed. For instance, a sequence of one or more actions of a user may be observed. The observed action may be in response to being provided a recommendation. The user action may include viewing the recommended content, viewing other content, or viewing no content. At block 424, a recommendation (a) may be provided to the user. A (as of yet not fully trained) recommendation policy may be employed to determine the recommendation based on the observed current state. A search engine may be employed to provide the recommendation to the user.

At block 426, a new state (s'), or a transition to the new state of the learning environment is observed. The transition from the current state to the new state may be in response to a user action that is in response to being provided the recommendation. At block 428, a reward signal (or simply a reward) (r) is observed, in response to the user action and/or transition to the new state. At block 430, the currently available active data is updated to include the observed current state, recommendation, new state, and reward associated with the state transition. In some embodiments, the currently available active data is updated to include the n-tuple (s, a, s', r).

At block 432, the transition model is updated based on the passive data and the updated currently available active data. Various embodiments for updating a transition model are discussed throughout, as well as in the '263 application. At block 434, a value iteration is performed over the state-value functions based on the updated transition model and the updated currently available active data. At block 436, the recommendation policy is updated based on the updated transition model and the updated state-value function. For instance, the recommendation policy may be optimized to maximize various metrics, such as but not limited to user retention, user dwelling time, user engagement, and the like.

Referring now to FIG. 5, a flow diagram is provided illustrating another method 500 for using passive data when training a learning agent to provide recommended actions. Each block of the method 500 and any other methods described herein comprises a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few. The method 500 may be performed, for instance, by the recommendation module 110 and transition model update module 112 of FIG. 1.

Initially, as shown at block 502, passive data is obtained. The passive data includes information regarding sequences of user actions without recommendations from a recommendation system. The passive data can be data collected, for instance, before a recommendation system was developed and/or used. In some configurations, the passive data includes information regarding a sequence of states based on the path of user actions followed by each user.

Currently available active data is then obtained, as shown at block 504. The active data is collected after the recommendation system is initiated and includes recommended actions previously provided by the recommendation system and state information associated with each recommended action. Generally, the active data includes sequences of user actions similar to the passive data but also identifies the recommended actions provided by the recommendation system at each time a user action was taken. In some cases, the active data can also include information regarding rewards provided at each epoch.

As shown at block 506, a transition model of the recommendation system is updated using the passive data and the currently available active data. As previously discussed, the transition model provides transition probabilities between pairs of states for each of a number of available recommended actions. The transition probabilities are generated from the passive data and at least one parameter derived from the currently available passive data. As discussed above, some embodiments use MDP to generate the transitions probabilities with a linking function to transition between the passive data and the MDP probabilities.

The transition model is used to select a recommended action based on the current state, as shown at block 508. The recommended action is selected in an effort to learn an optimal policy that dictates what action should be recommended given different user states in order to maximize the overall rewards for a recommendation session. After providing the recommendation action to a user device, data is received to identify a new state, as shown at block 510. This data may include, for instance, an action selected by the user in response to the recommended action. The currently available active data is also updated based on the recommended action and the previous state and new state, as shown in block 512. The process of: updating the transition model from available active data, providing a recommended action, and updating the active data from blocks 504-512 is repeated for each epoch of interaction between a user device and the recommendation system.

FIG. 6 provides a flow diagram showing a method 600 for using a clustering approach to derive parameters used to generate transition probabilities. As shown at block 602, a preliminary parameter value is determined for each of a number of available states based on currently available active data. The parameter values can be determined, for instance, using a linking function as discussed hereinabove.

The states are grouped into one or more clusters based on the preliminary parameter values, as shown at block 604. A shared parameter value is then generated for each cluster, as shown at block 606. The shared parameter value for a cluster can comprise, for instance, a mean or median value based on the preliminary parameter values of states in the cluster. For each cluster, the shared parameter derived for the cluster is assigned to each state included in that cluster, as shown at block 608. Those parameters can then be employed in deriving transition probabilities as discussed hereinabove.

As noted above, in some configurations, the clustering is performed based on confidence values determined for parameter values. In particular, clusters are selected to ensure that the confidence values satisfy a threshold level of confidence. As more active data is selected, more clusters with fewer states can be generated with sufficient confidence to increase model expressiveness. In some cases, the clustering is performed by splitting previously formed clusters when the threshold level of confidence can be satisfied by the new clusters formed from the splitting.

Illustrative Computing Device

Having described implementations of the present disclosure, an exemplary operating environment in which embodiments of the present invention may be implemented is described below in order to provide a general context for various aspects of the present disclosure. Referring to FIG. 7 in particular, an exemplary operating environment for implementing embodiments of the present invention is shown and designated generally as computing device 700. Computing device 700 is but one example of a suitable computing environment and is not intended to suggest any limitation as to the scope of use or functionality of the invention. Neither should the computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 7, computing device 700 includes bus 710 that directly or indirectly couples the following devices: memory 712, one or more processors 714, one or more presentation components 716, input/output (I/O) ports 718, input/output components 720, and illustrative power supply 722. Bus 710 represents what may be one or more busses (such as an address bus, data bus, or combination thereof). Although the various blocks of FIG. 7 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterate that the diagram of FIG. 7 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 500 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer-storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc. The I/O components 720 may provide a natural user interface (NUI) that processes air gestures, voice, or other physiological inputs generated by a user. In some instance, inputs may be transmitted to an appropriate network element for further processing. A NUI may implement any combination of speech recognition, touch and stylus recognition, facial recognition, biometric recognition, gesture recognition both on screen and adjacent to the screen, air gestures, head and eye-tracking, and touch recognition associated with displays on the computing device 700. The computing device 700 may be equipped with depth cameras, such as, stereoscopic camera systems, infrared camera systems, RGB camera systems, and combinations of these for gesture detection and recognition. Additionally, the computing device 700 may be equipped with accelerometers or gyroscopes that enable detection of motion.

The subject matter of the present invention is described with specificity herein to meet statutory requirements. However, the description itself is not intended to limit the scope of this patent. Rather, the inventors have contemplated that the claimed subject matter also might be embodied in other ways, to include different steps or combinations of steps similar to the ones described in this document, in conjunction with other present and/or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

As described above, implementations of the present disclosure generally relate to bootstrapping sequential recommendation systems from passive data. Embodiments of the present invention have been described in relation to particular aspects, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objectives set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   receiving passive data that encodes sequences of a plurality of states of an environment resulting from user actions browsing sequences of content without recommendations;
   receiving currently available active data that encodes a state transition from a current state to a new state of the environment resulting from a user action taken in response to being provided a recommendation associated with the content and determined by a recommendation policy based on the current state and a reward signal indicating a benefit associated with taking the recommendation; and
   training a recommendation system by iteratively updating a transition model to include a plurality of transition probabilities between pairs of states of the environment that are generated by using a combination of the passive data and the currently available active data, iteratively updating the recommendation policy based on the iteratively updated transition model and the combination of the passive data and the currently available active data, and iteratively updating a database to store additional recommendations associated with the additional state transitions, additional reward signals associated with the additional state transitions, and the currently available active data by including additional state transitions.

2. The one or more computer storage media of claim 1, wherein the content includes tutorial content for a software application and the recommendation associated with the content is to view a portion of the tutorial content for the software application.

3. The one or more computer storage media of claim 1, wherein iteratively updating the recommendation policy includes performing a value iteration on the recommendation policy based on the reward signal encoded by the currently available active data and the transition model.

4. The one or more computer storage media of claim 1, wherein iteratively updating the recommendation policy includes using the reward signal encoded by the currently available active data to optimize user retention, user dwelling time, or user engagement.

5. The one or more computer storage media of claim 1, wherein each of the plurality of states corresponds to a sequence of one or more portions of browsed tutorial content.

6. The one or more computer storage media of claim 1, wherein the operations further comprise:
 providing the recommendation policy to a search engine; and
 employing the search engine to recommend sequences of the content to a plurality of users.

7. The one or more computer storage media of claim 1, wherein the recommendation system comprises a Markov decision process-based recommendation system.

8. The one or more computer storage media of claim 1, wherein the plurality of transition probabilities that are included in the transition model comprise probabilities between each pair of the plurality of states of the environment for the recommendation.

9. The one or more computer storage media of claim 8, wherein the plurality of transition probabilities is updated using maximum likelihood principle.

10. The one or more computer storage media of claim 1, wherein the transition model includes at least one parameter value that is derived from the currently available active data using an n-gram model.

11. The one or more computer storage media of claim 1, wherein the transition model includes at least one parameter value that is derived from a clustering algorithm.

12. The one or more computer storage media of claim 11, wherein the clustering algorithm comprises:
 determining a preliminary parameter value for each of the plurality of states based on the currently available active data;
 grouping the plurality of states into one or more clusters based on the preliminary parameter value for each state;
 deriving a shared parameter value for each cluster based on the preliminary parameter value for each state in the cluster; and
 assigning the shared parameter value for each cluster to each state grouped in the cluster.

13. The one or more computer storage media of claim 12, wherein the states are grouped into the one or more clusters based on confidence values for the shared parameter values for the clusters.

14. A computer-implemented method comprising:
 receiving passive data that encodes sequences of a plurality of states of an environment resulting from user actions browsing sequences of content without recommendations;
 receiving currently available active data that encodes a state transition from a current state to a new state of the environment resulting from a user action taken in response to being provided a recommendation associated with the content and determined by a recommendation policy based on the current state and a reward signal indicating a benefit associated with taking the recommendation; and
 training a recommendation system by iteratively updating a transition model to include a plurality of transition probabilities between pairs of states of the environment that are generated by using a combination of the passive data and the currently available active data, iteratively updating the recommendation policy based on the iteratively updated transition model and the combination of the passive data and the currently available active data, and iteratively updating a database to store additional recommendations associated with the additional state transitions, additional reward signals associated with the additional state transitions, and the currently available active data by including additional state transitions.

15. The computer-implemented method of claim 14, wherein the content includes tutorial content for a software application and the recommendation associated with the content is to view a portion of the tutorial content for the software application.

16. The computer-implemented method of claim 14, wherein iteratively updating the recommendation policy includes performing a value iteration on the recommendation policy based on the reward signal encoded by the currently available active data and the transition model.

17. The computer-implemented method of claim 14, wherein each of the plurality of states corresponds to a sequence of one or more portions of browsed tutorial content.

18. A computer system comprising:
 one or more hardware processors;
 a data store comprising:
 passive data that encodes sequences of a plurality of states of an environment resulting from user actions browsing sequences of content without recommendations; and
 currently available active data that encodes a state transition from a current state to a new state of the environment resulting from a user action taken in response to being provided a recommendation associated with the content and determined by a recommendation policy based on the current state and a reward signal indicating a benefit associated with taking the recommendation; and
 a learning agent configured to use the one or more hardware processors to iteratively update a transition model to include a plurality of transition probabilities between pairs of states of the environment that are generated by using a combination of the passive data and the currently available active data, iteratively update the recommendation policy based on the iteratively updated transition model and the combination of the passive data and the currently available active data, and iteratively update the data store to include additional recommendations associated with the additional state transitions, additional reward signals associated with the additional state transitions, and the currently available active data by including additional state transitions.

19. The computer system of claim 18, wherein the content includes tutorial content for a software application and recommendation associated with the content is to view a portion of the tutorial content for the software application.

20. The computer method of claim 19, wherein the software application is an image-editing application.

* * * * *